US012282122B2

(12) United States Patent
Huang

(10) Patent No.: US 12,282,122 B2
(45) Date of Patent: Apr. 22, 2025

(54) NEUTRON MEASURING METHOD AND NEUTRON MEASURING DEVICE

(71) Applicant: HERON NEUTRON MEDICAL CORP., Hsinchu County (TW)

(72) Inventor: Chun-Kai Huang, Hsinchu County (TW)

(73) Assignee: HERON NEUTRON MEDICAL CORP., Hsinchu County (TW)

(*) Notice: Subject to any disclaimer, the term of this patent is extended or adjusted under 35 U.S.C. 154(b) by 158 days.

(21) Appl. No.: 18/305,393

(22) Filed: Apr. 24, 2023

(65) Prior Publication Data

US 2024/0255654 A1   Aug. 1, 2024

(30) Foreign Application Priority Data

Jan. 31, 2023  (TW) .................................. 112103374

(51) Int. Cl.
G01T 1/161   (2006.01)
(52) U.S. Cl.
CPC .................... *G01T 1/161* (2013.01)
(58) Field of Classification Search
None
See application file for complete search history.

(56) References Cited

U.S. PATENT DOCUMENTS

| | | | | |
|---|---|---|---|---|
| 3,086,117 A * | 4/1963 | Klein | .................. | G01T 3/08 250/370.07 |
| 4,381,454 A * | 4/1983 | Griffith | ..................... | G01T 5/10 376/153 |
| 5,321,269 A * | 6/1994 | Kitaguchi | ................. | G01T 3/08 250/252.1 |
| 5,572,027 A * | 11/1996 | Tawil | ..................... | G01T 1/026 250/389 |
| 11,867,853 B2 * | 1/2024 | Aoyama | ................... | G01T 3/08 |
| 2006/0138345 A1 * | 6/2006 | Fehrenbacher | ........... | G01T 3/00 250/482.1 |
| 2013/0341530 A1 * | 12/2013 | Akselrod | .................. | G01T 1/10 250/484.5 |
| 2017/0023681 A1 | 1/2017 | Patel | | |
| 2022/0091281 A1 | 3/2022 | Romanyukha | | |
| 2024/0045087 A1 * | 2/2024 | Kuroki | ..................... | G01T 3/08 |

FOREIGN PATENT DOCUMENTS

| | | |
|---|---|---|
| CN | 107450090 A | 12/2017 |
| CN | 108367158 A | 8/2018 |
| TW | 201514526 A | 4/2015 |

* cited by examiner

Primary Examiner — Marcus H Taningco
(74) Attorney, Agent, or Firm — CKC & Partners Co., LLC

(57) ABSTRACT

A neutron measuring method includes placing a conversion material on a first positioning component, in which the conversion material includes a radioactive region. A radiation dosimeter is placed on a second positioning component. The first positioning component and the second positioning component are overlapped such that the radioactive region of the conversion material is exposed to the radiation dosimeter.

18 Claims, 16 Drawing Sheets

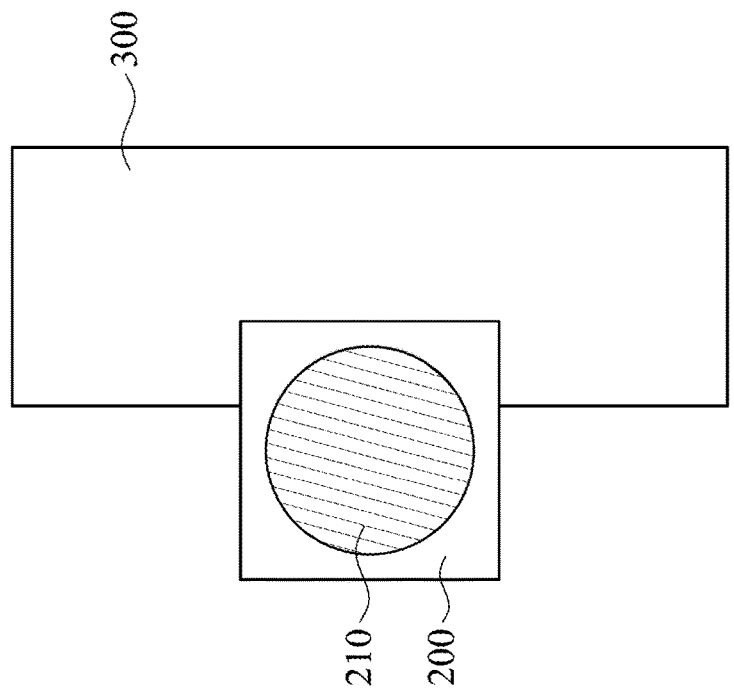
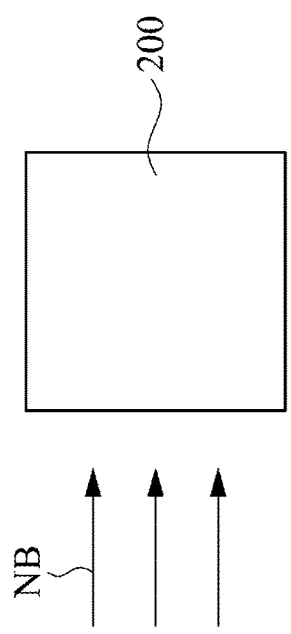
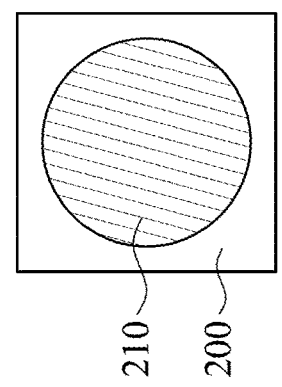

NEUTRON MEASURING METHOD AND NEUTRON MEASURING DEVICE

CROSS-REFERENCE TO RELATED APPLICATION

This application claims priority to Taiwan application Serial Number 112103374, filed Jan. 31, 2023, which is herein incorporated by reference in its entirety.

BACKGROUND

Technical Field

The present disclosure relates to a neutron measuring method and a neutron measuring device.

Description of Related Art

Measurement of characteristics of a boron neutron capture therapy (BNCT) beam includes absolute intensity, energy distribution, spatial distribution, angular distribution, and the like. Since the BNCT beam is a mixed radiation field containing neutrons and gamma rays, active or passive detectors sensitive only to the neutrons are used to distinguish between the neutrons and the gamma rays for measurement. For the spatial distribution measurement on neutrons, a single measurement using multiple detectors, multiple measurements using a single detector, or an indirect neutron radiography method are generally used. For the indirect neutron radiography method, however, there are still many problems with the exposure process between the conversion material and the radiation dosimeter, such as an unstable operation leading to excessive radiation doses received by operators.

In this regard, how to provide a neutron measuring method and a neutron measuring device that can overcome the aforementioned problem is one of the targets in the research and development in the related fields.

SUMMARY

One aspect of the present disclosure is a neutron measuring method.

According to some embodiments of the present disclosure, a neutron measuring method includes placing a conversion material on a first positioning component, in which the conversion material includes a radioactive region. A radiation dosimeter is placed on a second positioning component. The first positioning component and the second positioning component are overlapped such that the radioactive region of the conversion material is exposed to the radiation dosimeter.

In some embodiments, the first positioning component includes a main body and a recess, in which placing the conversion material on the first positioning component is performed such that the conversion material is placed in the recess and a top surface of the conversion material is substantially flush with a top surface of the main body.

In some embodiments, overlapping the first positioning component and the second positioning component is performed such that the radiation dosimeter is in contact with the main body of the first positioning component.

In some embodiments, the neutron measuring method further includes placing an anti-slip material on the first positioning component prior to placing the conversion material on the first positioning component.

In some embodiments, the conversion material is separated from a bottom surface of the recess of the first positioning component by the anti-slip material.

In some embodiments, the conversion material is in contact with the anti-slip material, and the anti-slip material is in contact with a bottom surface of the recess of the first positioning component.

In some embodiments, overlapping the first positioning component and the second positioning component is performed such that the radiation dosimeter fully covers the radioactive region of the conversion material.

In some embodiments, the second positioning component includes a top portion, a first supporting side portion, a second supporting side portion, and a rear blocking plate. The first supporting side portion and the second supporting side portion are respectively connected to two opposite sides of the top portion. The top portion, the first supporting side portion, the second supporting side portion, and the rear blocking plate define a space.

In some embodiments, overlapping the first positioning component and the second positioning component is performed such that the first positioning component is placed in the space of the second positioning component.

In some embodiments, the first supporting side portion has a first concave edge and the second supporting side portion has a second concave edge, wherein placing the radiation dosimeter on the second positioning component is performed such that the radiation dosimeter is placed in a top portion of the space defined by the first concave edge and the second concave edge.

Another aspect of the present disclosure is a neutron measuring method.

According to some embodiments of the present disclosure, a neutron measuring method includes placing a conversion material on a first portion of a positioning component, in which the conversion material comprises a radioactive region. A radiation dosimeter is placed on a second portion of the positioning component, in which a first side of the first portion of the positioning component is connected to a first side of the second portion of the positioning component. A second side of the first portion of the positioning component and a second side of the second portion of the positioning component are overlapped such that the radioactive region of the conversion material is exposed to the radiation dosimeter.

In some embodiments, the first portion of the positioning component includes a first main body and a first recess, in which placing the conversion material on the first portion of the positioning component is performed such that the conversion material is placed in the first recess and a top surface of the conversion material is substantially flush with a top surface of the first main body.

In some embodiments, the second portion of the positioning component comprises a second main body and a second recess, in which placing the radiation dosimeter on the second portion of the positioning component is performed such that the radiation dosimeter is placed in the second recess and a top surface of the radiation dosimeter is substantially flush with a top surface of the second main body.

In some embodiments, overlapping the second side of the first portion of the positioning component and the second side of the second portion of the positioning component is performed such that the radiation dosimeter in the second recess is in contact with the conversion material in the first recess.

In some embodiments, overlapping the second side of the first portion of the positioning component and the second side of the second portion of the positioning component is performed such that the radiation dosimeter fully covers the radioactive region of the conversion material.

In some embodiments, the neutron measuring method further includes forming an imaging region on the radiation dosimeter after overlapping the second side of the first portion of the positioning component and the second side of the second portion of the positioning component. The imaging region is read on the radiation dosimeter.

In some embodiments, the neutron measuring method further includes performing a clean process on the radiation dosimeter prior to placing the conversion material on the first portion of the positioning component.

Another aspect of the present disclosure is a neutron measuring device.

According to some embodiments of the present disclosure, a neutron measuring device includes a first positioning component and a second positioning component. The first positioning component includes a main body and a recess, in which the recess is configured to accommodate a conversion material having a radioactive region. The second positioning component includes an accommodation space, in which the accommodation space is configured to accommodate a radiation dosimeter. When the second positioning component is overlapped on the first positioning component, the radiation dosimeter in the accommodation space of the second positioning component is in contact with the conversion material in the recess of the first positioning component.

In some embodiments, the second positioning component further includes a top portion, a first supporting side portion, a second supporting side portion, and a rear blocking plate. The first supporting side portion and the second supporting side portion are respectively connected to two opposite sides of the top portion, and the accommodation space is defined by the top portion, the first supporting side portion, the second supporting side portion, and the rear blocking plate. The first supporting side portion has a first concave edge and the second supporting side portion has a second concave edge, the first concave edge and second concave edge are configured to guide the radiation dosimeter along a direction into a portion of the accommodation space, and the remaining portions of the accommodation space is configured to accommodate the first positioning component.

In some embodiments, a side of the first positioning component is pivotally connected to a side of the second positioning component.

In the aforementioned embodiments, with the configuration of the positioning component (e.g., the first positioning component and the second positioning component), a stable and reliable positioning method can be provided to improve the exposure process of the conversion material and the radiation dosimeter. As such, an operation process can be simplified, a processing time can be reduced, and a risk of excessive radiation doses received by operators can be reduced.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIGS. 2, 3, 4, 6-11 and 18 are schematic views of the neutron measuring method, in portion or entirety, at various operation stages in accordance with some embodiments of the present disclosure.

DETAILED DESCRIPTION

Figure 1:
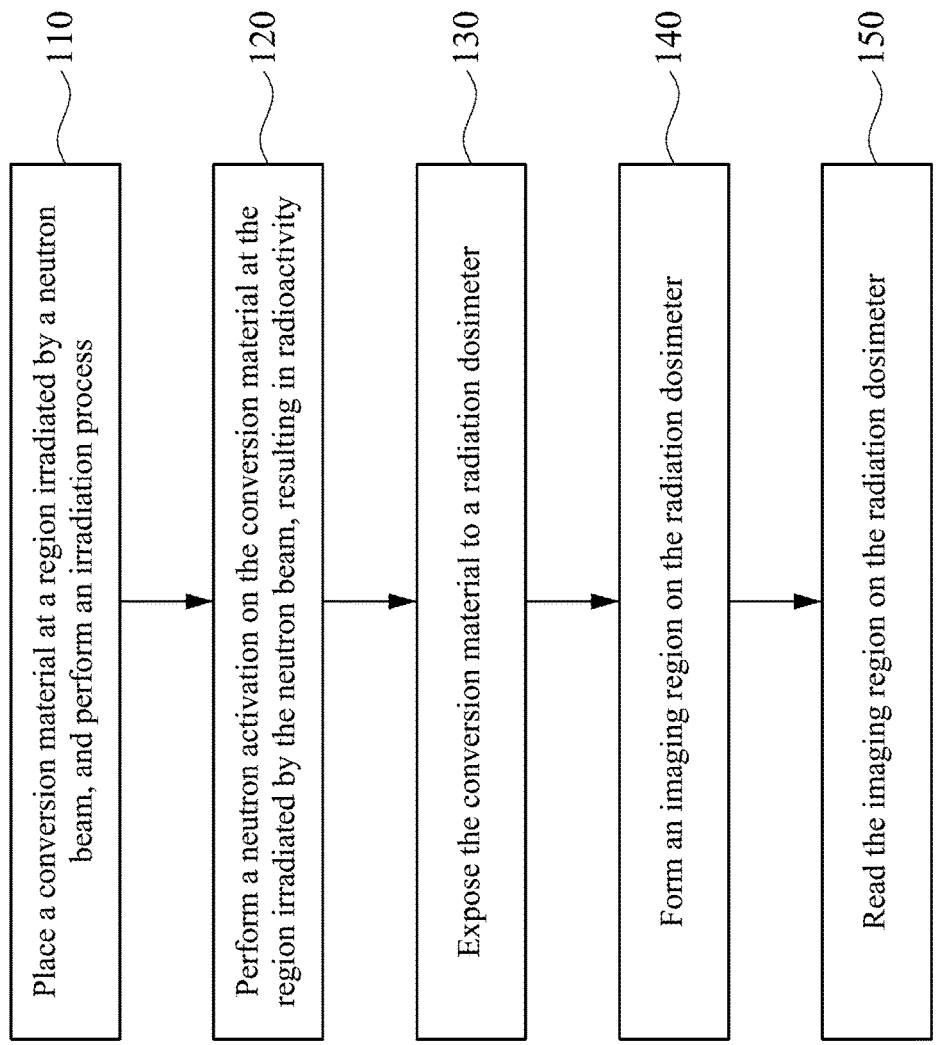
FIG. 1 is a flow chart of a neutron measuring method in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

As used herein, "around," "about," "approximately," or "substantially" shall generally mean within 20 percent, or within 10 percent, or within 5 percent of a given value or range. Numerical quantities given herein are approximate, meaning that the term "around," "about," "approximately," or "substantially" can be inferred if not expressly stated.

FIG. 1 is a flow chart of a neutron measuring method 100 in accordance with some embodiments of the present disclosure. The neutron measuring method 100 includes a relevant part of the entire neutron measuring method. It is understood that additional operations may be provided before, during, and after the operations shown by FIG. 1, and some of the operations described below can be replaced or eliminated for additional embodiments of the neutron measuring method 100. The order of the operations/processes may be interchangeable.

FIGS. 2, 3, 4, 6-11 and 18 are schematic views of the neutron measuring method, in portion or entirety, at various operation stages in accordance with some embodiments of the present disclosure. The neutron measuring method 100 begins at operation 110, where a conversion material is placed at a region irradiated by a neutron beam, and an irradiation process is performed. Referring to FIG. 2, in some embodiments of the operation 110, a conversion material 200 is placed at a region irradiated by a neutron beam NB, and an irradiation process is performed. In some embodiments, the neutron beam NB is a boron neutron capture therapy (BNCT) neutron beam. In some embodiments, the conversion material 200 includes at least one element of copper, aluminum, gold, manganese, scandium, nickel, indium, sodium, cobalt, titanium, magnesium, platinum, iron, vanadium, zirconium, lanthanum, chlorine, bromine, phosphorus, sulfur; an alloy or compound of the foregoing elements in any combination.

The neutron measuring method 100 then proceeds to operation 120, where a neutron activation is performed on the conversion material at the region irradiated by the neutron beam, resulting in radioactivity (i.e., a radioactive region is formed in the conversion material after being irradiated by the neutron beam). Referring to FIGS. 2 and 3, in some embodiments of the operation 120, a neutron activation is performed on the conversion material 200 at the region irradiated by the neutron beam NB, resulting in radioactivity (i.e., a radioactive region 210 is formed in conversion material 200 after being irradiated by the neutron beam NB). In greater details, stable elements in the conversion material 200 are hit by the neutron beam NB and thus the stable elements in the conversion material 200 are transformed into the radioactive region 210 containing radioactive isotopes.

The neutron measuring method 100 then proceeds to operation 130, where the conversion material is exposed to a radiation dosimeter. Referring to FIG. 4, in some embodiments of the operation 130, conversion material 200 is exposed to a radiation dosimeter 300. Since the radiation dosimeter 300 is reactive (sensitive) to the radiation, the radioactive region 210 of the conversion material 200 may transfer the radiation energy to the radiation dosimeter 300, which is referred to as exposure.

Figure 5:
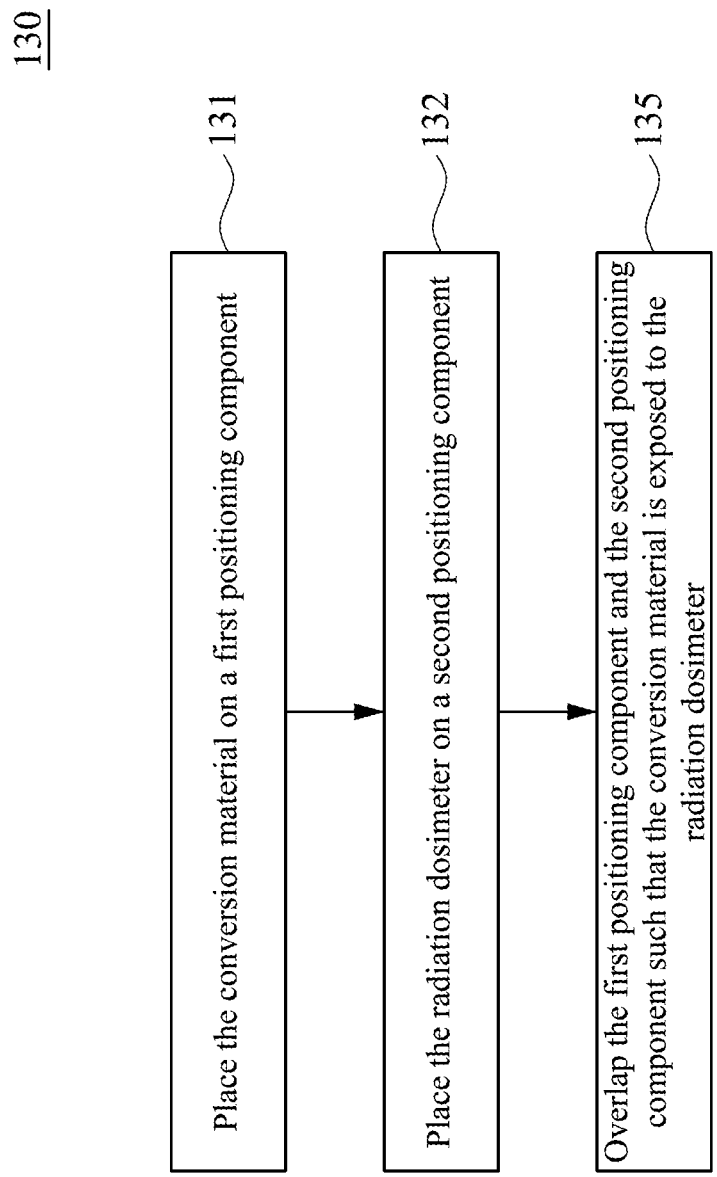
FIG. 5 is a flow chart of a neutron measuring method in accordance with some embodiments of the present disclosure.
Figure 9:
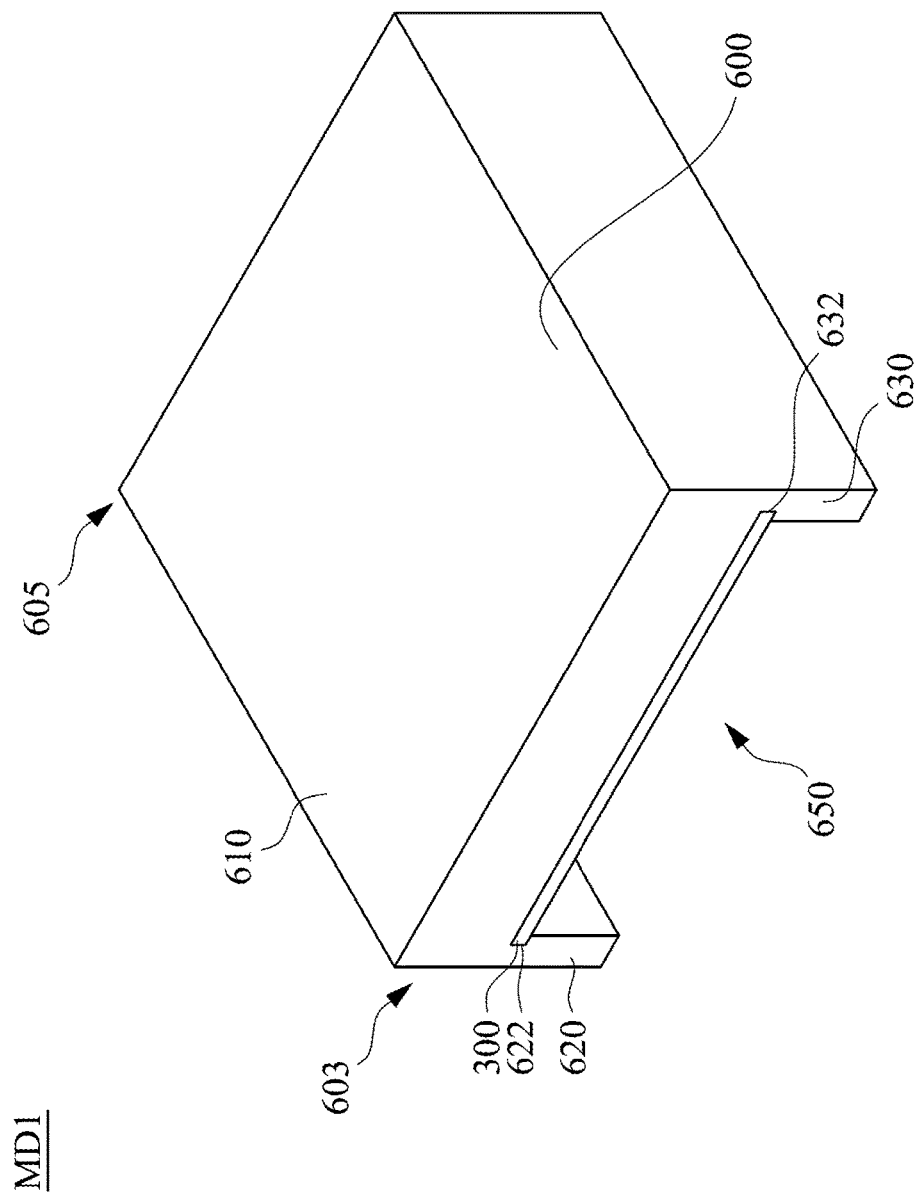
Figure 10:
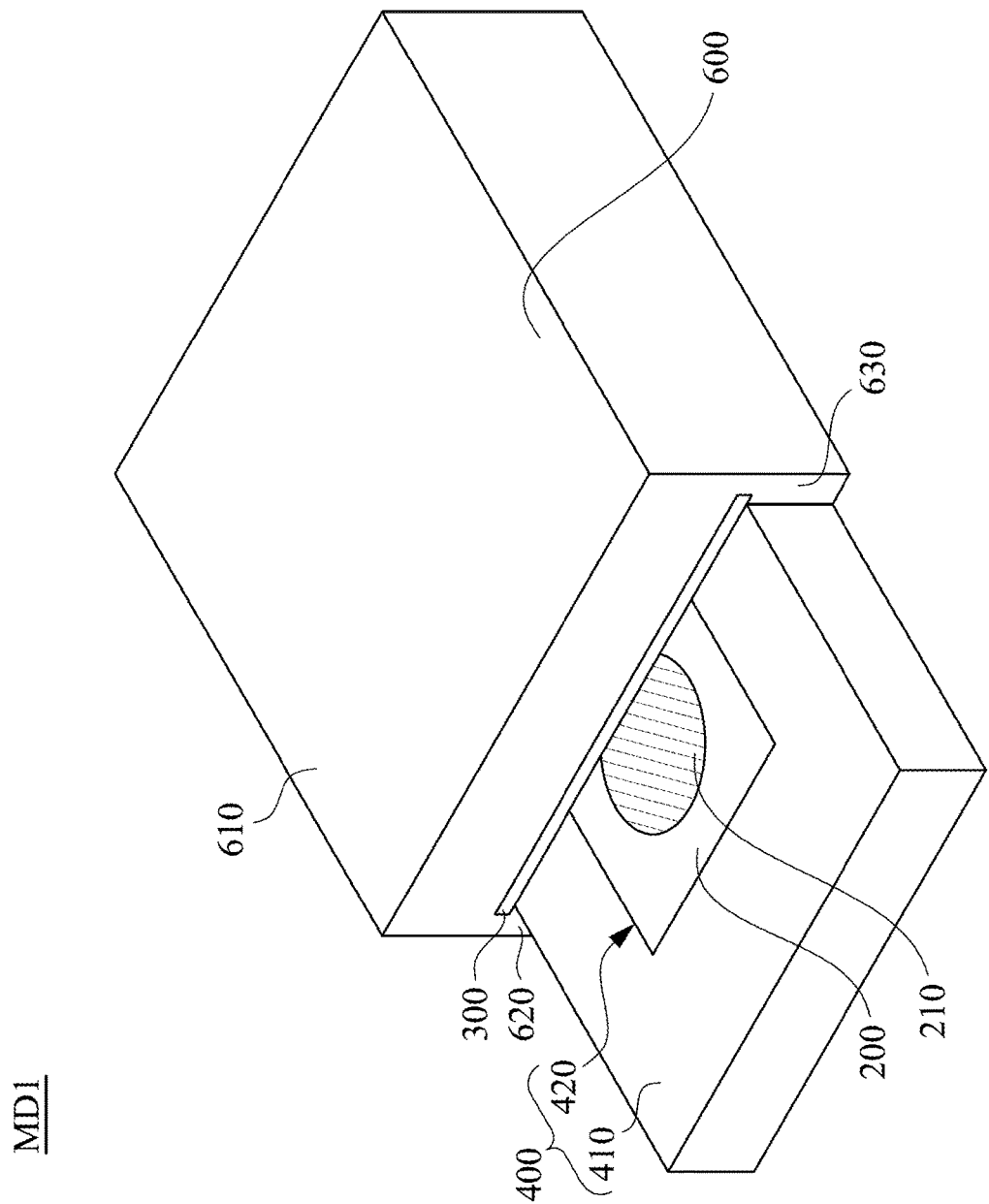
Figure 11:
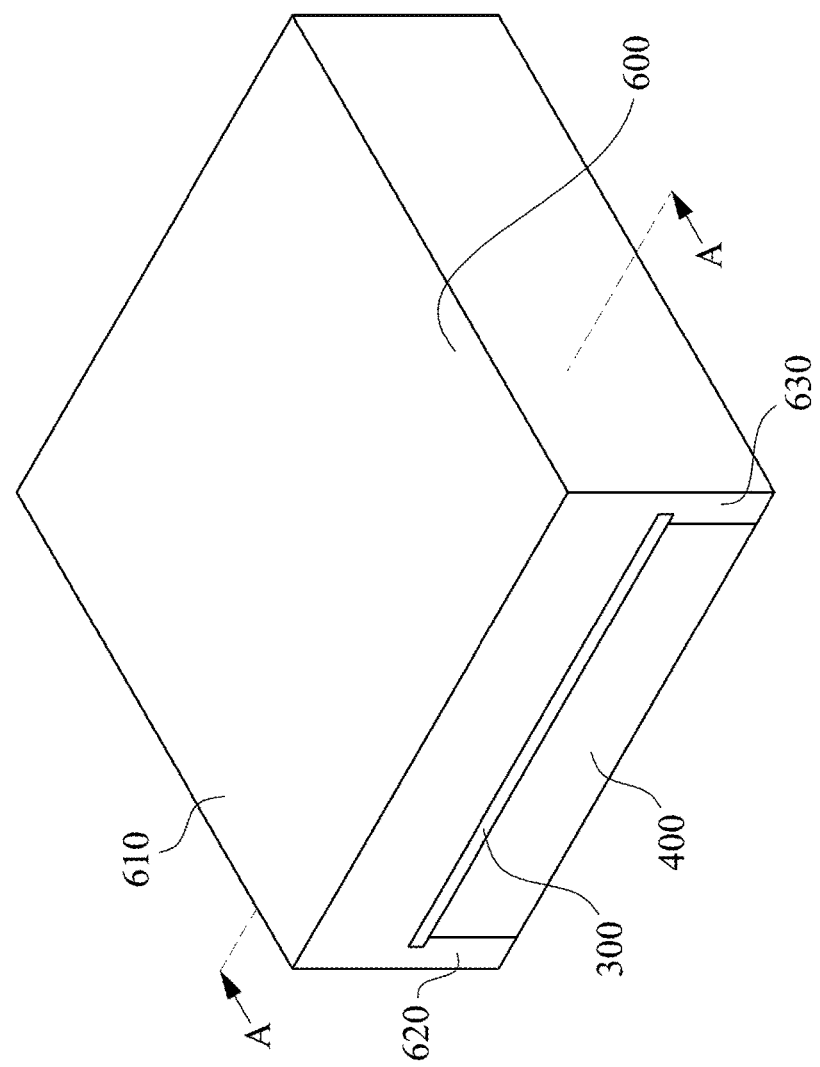
Figure 12:
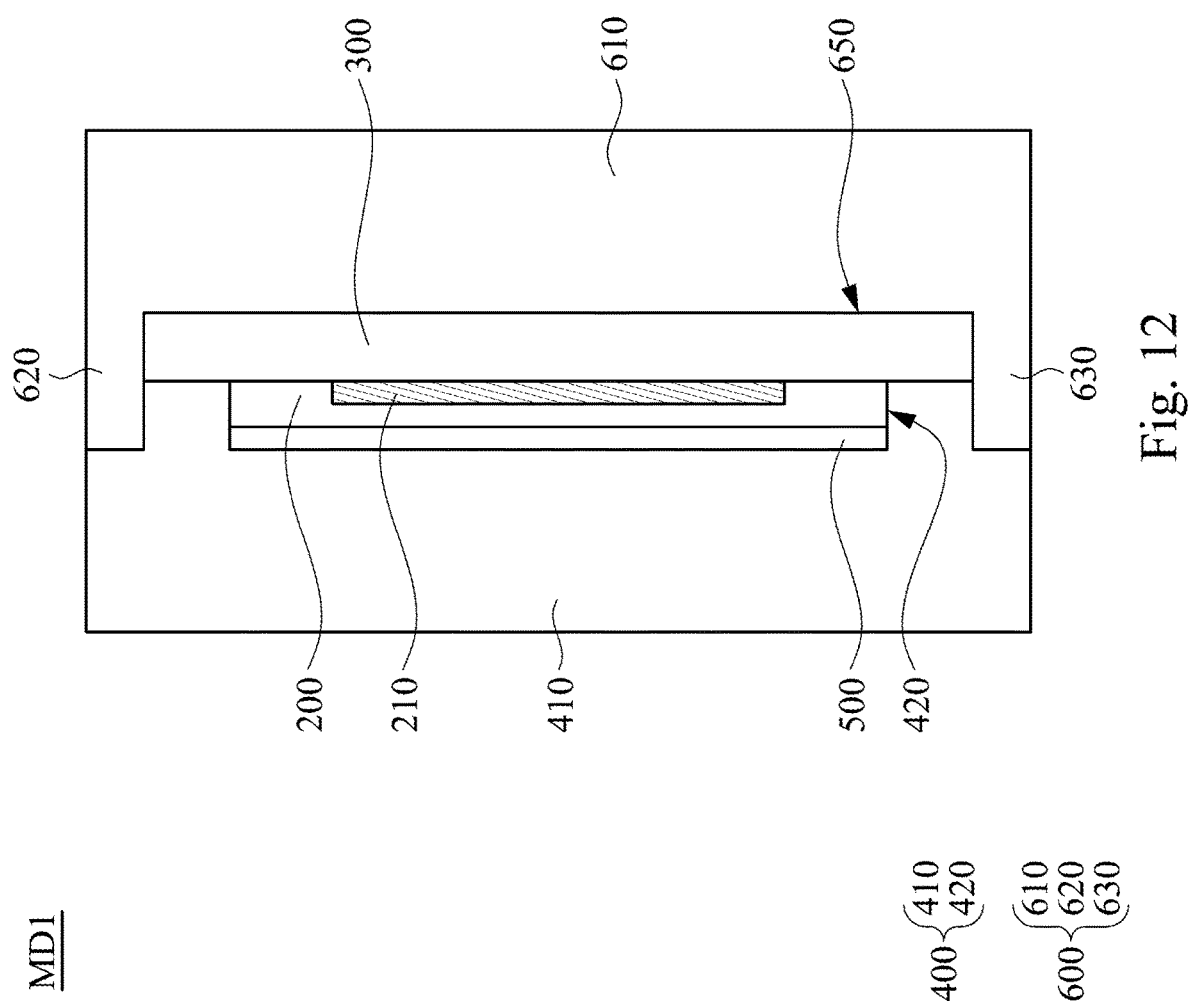
FIG. 12 is a cross-section view of the neutron measuring device taken along line A-A in FIG. 11.

In some embodiments, the operation 130 includes multiple steps (operations) and can be performed by using a neutron measuring device MD1 illustrated in FIGS. 10 to 12. FIG. 5 is a flow chart of the operation 130 of the neutron measuring method 100 of FIG. 1 in accordance with some embodiments of the present disclosure. For clarity and ease of explanation, the flow chart of FIG. 5 (i.e., the operation 130) is described together with FIGS. 6 to 12. The flow chart shown in FIG. 5 is merely an example, and is not intended to limit the present disclosure beyond what is explicitly recited in the claims. Additional operations can be provided before, during, and after the operation 130 of FIG. 5, and some operations described can be replaced, eliminated, or moved around for additional embodiments of the process. For clarity and ease of explanation, some elements of the figures have been simplified.

Figure 6:
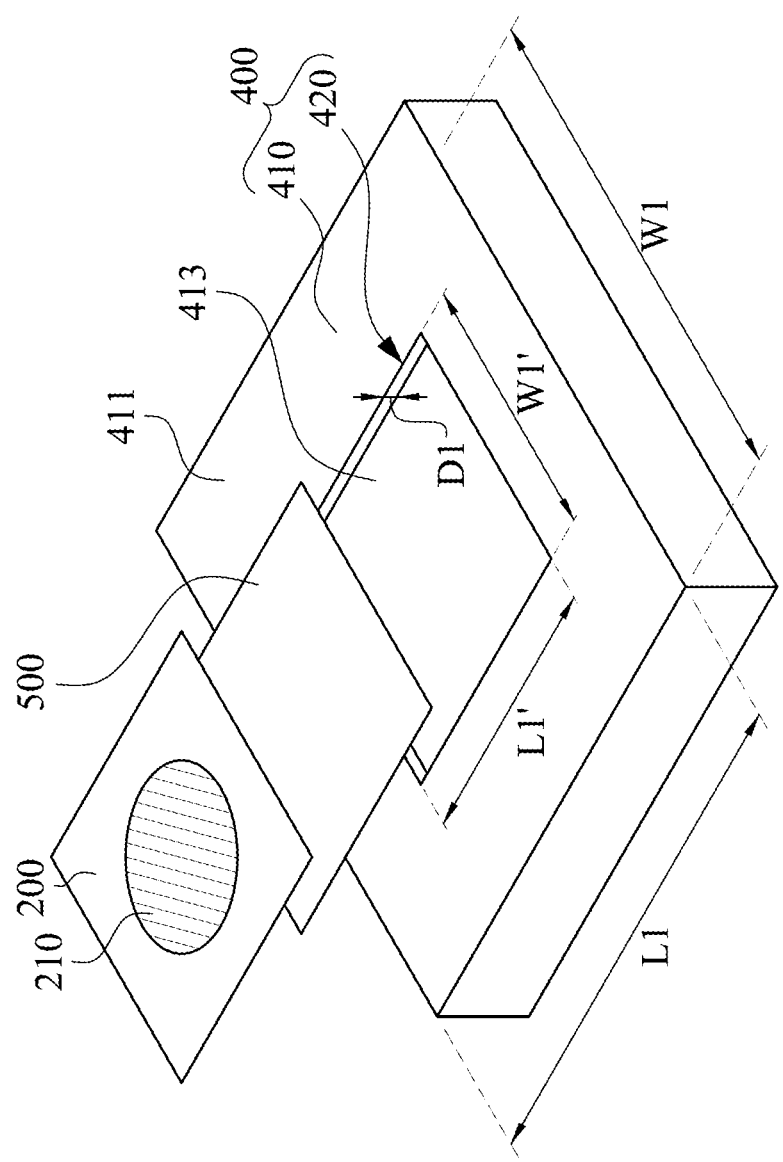
Figure 7:
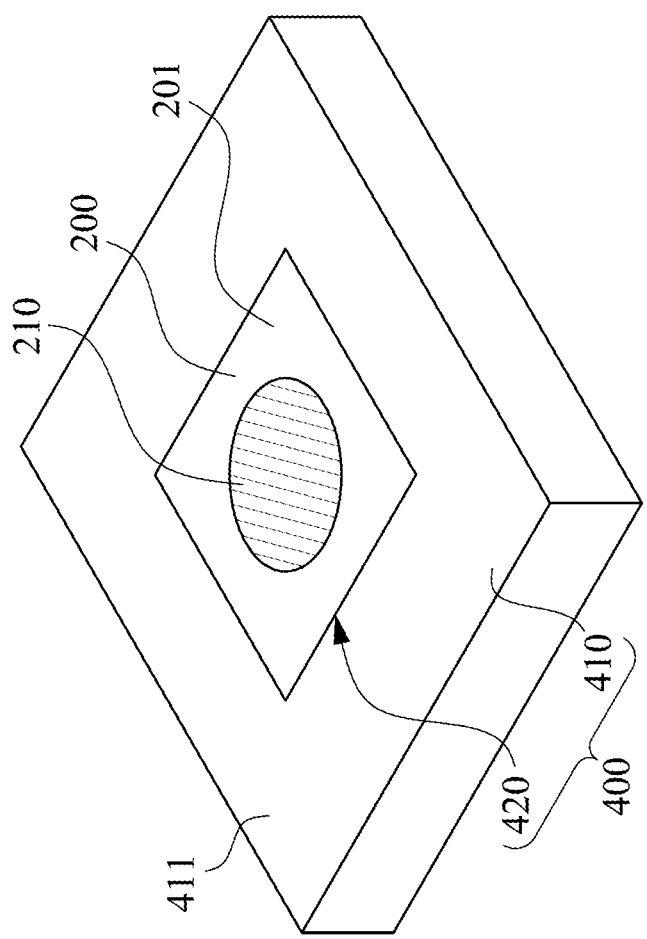

Referring to FIG. 5, at operation 131, the conversion material is placed on a first positioning component. FIGS. 6 and 7 are schematic views of the conversion material 200 and the first positioning component 400 at various operation stages in accordance with some embodiments of the present disclosure. Specifically, FIG. 6 is a schematic view illustrating the conversion material 200 is not placed on the first positioning component 400, and FIG. 7 is a schematic view illustrating the conversion material 200 is placed on the first positioning component 400. The first positioning component 400 includes a main body 410 and a recess 420, in which the recess 420 extends downward from a top surface 411 of the main body 410 and exposes a bottom surface 413, and the recess 420 is configured to accommodate the conversion material 200 having a radioactive region 210. In some embodiments, a length L1 of the main body 410 of the first positioning component 400 is in a range of about 50 millimeters to about 300 millimeters (e.g., 200 millimeters). In some embodiments, the top surface 411 of the main body 410 of the first positioning component 400 has a rectangular profile. For example, the length L1 and a width W1 of the top surface 411 of the main body 410 of the first positioning component 400 are not equal. Alternatively, in some embodiments where the top surface 411 of the main body 410 of the first positioning component 400 has a square profile, the length L1 and the width W1 of the top surface 411 of the main body 410 of the first positioning component 400 are equal. In some embodiments, a width W1' of the recess 420 of the first positioning component 400 is in a range of about 10 millimeters to about 250 millimeters (e.g., 150 millimeters), and a depth D1 of the recess 420 of the first positioning component 400 is in a range of about 1.5 millimeters to about 30 millimeters (e.g., 15 millimeters). In some embodiments, the recess 420 is located at the middle of the top surface 411 of the main body 410. The recess 420 may have a rectangular profile. Specifically, the length L1' and the width W1' of the exposed bottom surface 413 of the recess 420 are not equal. Alternatively, in some embodiments where the recess 420 has a square profile, the length L1' and the width W1' of the exposed bottom surface 413 of the recess 420 are equal.

In some embodiments, the recess 420 is further configured to accommodate an anti-slip material 500, in which the anti-slip material 500 is used to enhance the friction force between the conversion material 200 and the first positioning component 400, thereby helping the conversion material 200 be fixed (or secured) in the recess 420. In some embodiments, the anti-slip material 500 includes thermoplastic or thermosetting polymers such as plastic, rubber, silicone, polyvinylchloride (PVC), polyethylene (PE), polypropylene (PP), polystyrene (PS), epoxy, or other suitable polymers.

As shown in FIG. 7, the conversion material 200 is placed on the first positioning component 400 such that the conversion material 200 is located in the recess 420 of the first positioning component 400 and a top surface 201 of the conversion material 200 is substantially flush with (or level with) the top surface 411 of the main body 410. In some embodiments, before placing the conversion material 200 on the first positioning component 400, an anti-slip material 500 is placed on the first positioning component 400 to help the conversion material 200 be fixed (or secured) in the recess 420. In other words, as shown in FIGS. 6 and 7, the anti-slip material 500 is in contact with the bottom surface 413 of the recess 420 of the first positioning component 400 and the conversion material 200 is in contact with the anti-slip material 500, such that the conversion material 200 is separated from the bottom surface 413 of the recess 420 of the first positioning component 400 by the anti-slip material 500.

Figure 8:
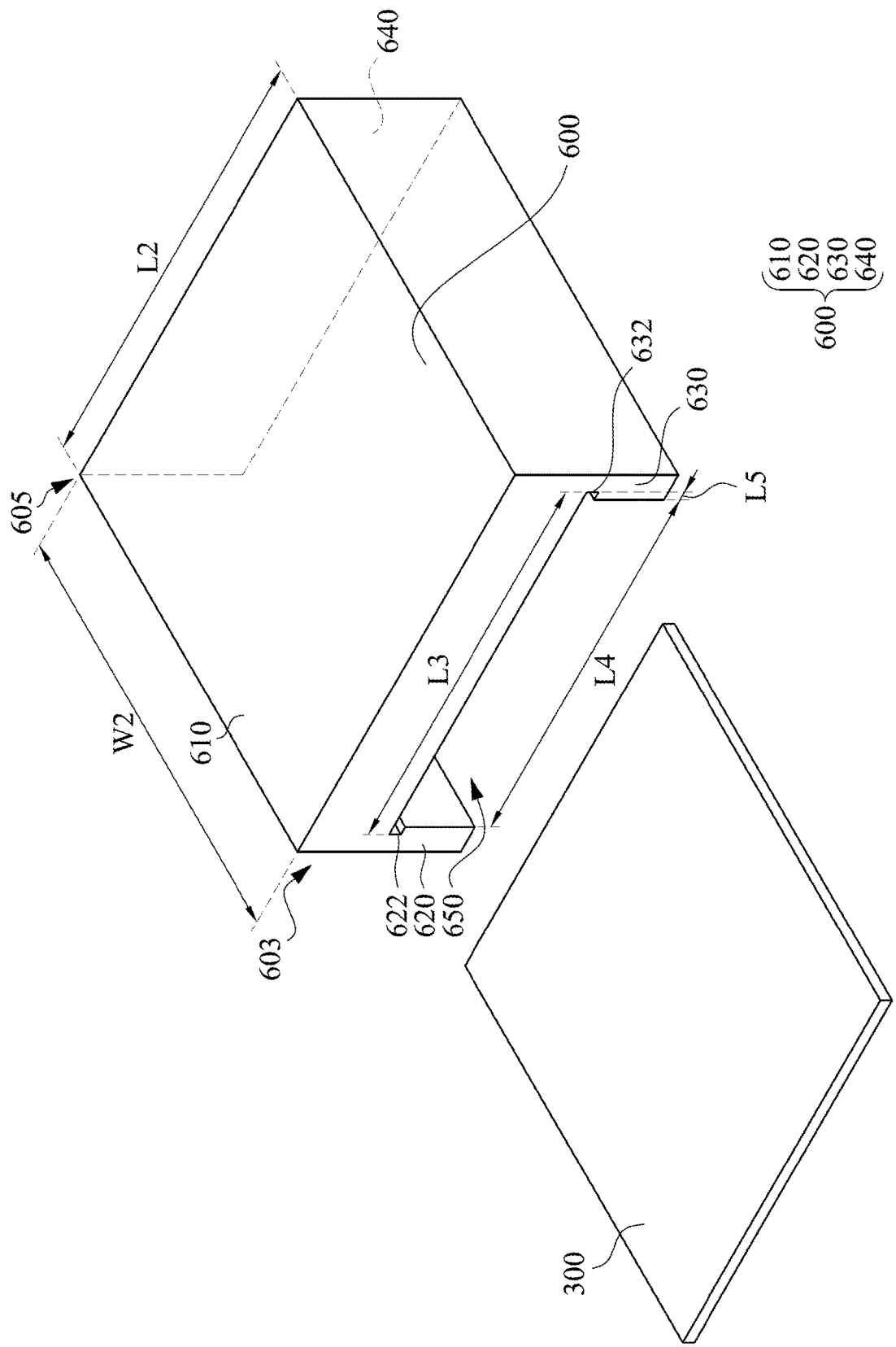

In operation 132 of FIG. 5, place the radiation dosimeter on a second positioning component. FIGS. 8 and 9 are schematic views of the radiation dosimeter 300 and the second positioning component 600 at various operation stages in accordance with some embodiments of the present disclosure. Specifically, FIG. 8 is a schematic view illustrating the radiation dosimeter 300 is not placed on the second positioning component 600, and FIG. 9 is a schematic view illustrating the radiation dosimeter 300 is placed on the second positioning component 600. The second positioning component 600 includes a top portion 610, a first supporting side portion 620, a second supporting side portion 630, and a rear blocking plate 640. The first supporting side portion 620 and the second supporting side portion 630 are respectively connected to two opposite sides of the top portion 610, and the top portion 610, the first supporting side portion 620, the second supporting side portion 630, and the rear blocking plate 640 together define a space 650, in which the space 650 may interchangeably be referred to as a accommodation space. The first supporting side portion 620 has a first concave edge 622 and the second supporting side portion 630 has a second concave edge 632. The first concave edge 622 and the second concave edge 632 are configured to guide the radiation dosimeter 300 along a direction (e.g., a lengthwise direction of the first supporting side portion 620 or a lengthwise direction of the second supporting side portion 630) into a portion (e.g., a top portion) of the space 650 and reach the rear blocking plate 640, and the remaining portions of the space 650 is configured to accommodate the first positioning component 400 (see FIG. 7). In other words, the first concave edge 622 of the first supporting side portion 620 and the second concave edge 632 of the second supporting side portion 630 define a accommodation region located at a top portion of the space 650, which is configured to accommodate the radiation dosimeter 300 (i.e., the radiation dosimeter 300 is placed in a top portion of the space 650 defined by the first concave edge 622 and the second concave edge 632).

In some embodiments, the second positioning component 600 has a front side 603 and a rear side 605, and the first concave edge 622 and the second concave edge 632 are located at the front side 603 of the second positioning component 600. The rear blocking plate 640 of the second positioning component 600 is located at the rear side 605 of the second positioning component 600. Since the second positioning component 600 includes the rear blocking plate 640 and the rear side 605 of the second positioning component 600 does not have an opening, the radiation dosimeter 300 may not protrude out of the rear side 605 of the second positioning component 600.

In some embodiments, a length L2 of a top portion 610 of the second positioning component 600 is in a range of about 100 millimeters to about 400 millimeters (e.g. 250 millimeters), and a width W2 of the top portion 610 of the second positioning component 600 is in a range of about 100 millimeters to about 400 millimeters (e.g. 250 millimeters). In some embodiments, a top surface of the top portion 610 of the second positioning component 600 has a rectangular profile. In some embodiments, a distance L3 between the first concave edge 622 of the first supporting side portion 620 of the second positioning component 600 and the second concave edge 632 of the second supporting side portion 630 is in a range of about 15 millimeters to about 300 millimeters (e.g. 200 millimeters). A distance L4 between the first supporting side portion 620 and the second supporting side portion 630 of the second positioning component 600 may be in a range of about 50 millimeters to about 300 millimeters (e.g. 200 millimeters). A length L5 of the first concave edge 622 of the first supporting side portion 620 (or the second concave edge 632 of the second supporting side portion 630) may be in a range of about 4 millimeters to about 50 millimeters (e.g. 10 millimeters).

As shown in FIGS. 8 and 9, the radiation dosimeter 300 is placed on the second positioning component 600, such that a surface of the radiation dosimeter 300, a surface of the first supporting side portion 620 and/or a surface of the second supporting side portion 630 are substantially flush at the front side 603 of the second positioning component 600. In other words, the radiation dosimeter 300 does not protrude out of the surface of the first supporting side portion 620 and/or the surface of the second supporting side portion 630 at the front side 603 of the second positioning component 600. In some embodiments, a width of the radiation dosimeter 300 is substantially equal to the width W2 of the top portion 610 of the second positioning component 600.

In operation 135 of FIG. 5, the first positioning component and the second positioning component are overlapped such that the radioactive region of the conversion material is exposed to the radiation dosimeter. FIGS. 10 and 11 are schematic views of the neutron measuring device MD1 at various operation stages in accordance with some embodiments of the present disclosure. Specifically, FIG. 10 is a schematic view illustrating the neutron measuring device MD1 with the first positioning component 400 and the second positioning component 600 not overlapped, and FIG. 11 is a schematic view illustrating the neutron measuring device MD1 with the second positioning component 600 overlapped on the first positioning component 400. As shown in FIG. 11, the first positioning component 400 and the second positioning component 600 are overlapped such that the radioactive region 210 of the conversion material 200 is exposed to the radiation dosimeter 300. In some embodiments, the first positioning component 400 and the second positioning component 600 are overlapped such that the radioactive region 210 of the conversion material 200 is in contact with the radiation dosimeter 300. The first positioning component 400 is placed in the space 650 of the second positioning component 600 (see FIG. 9).

FIG. 12 is a cross-section view of the neutron measuring device MD1 taken along line A-A in FIG. 11. Referring to FIGS. 11 and 12, the conversion material 200 is placed inside the recess 420 of the first positioning component 400, and the radiation dosimeter 300 is located in the space 650 of the second positioning component 600. Furthermore, the first supporting side portion 620 and the second supporting side portion 630 of the second positioning component 600 may be referred as a locking element to position (or fix) the first positioning component 400 in the space 650 of the second positioning component 600. With the configuration of the aforementioned neutron measuring device MD1, the stable and reliable positioning method can be provided to improve the exposure process of the conversion material 200 and the radiation dosimeter 300. As such, the operation process can be simplified, the processing time can be reduced, and the risk of excessive radiation doses received by operators can be reduced.

In some embodiments, an entirety of the neutron measuring device MD1 has a rectangular profile. The radiation dosimeter 300 is in contact with and fully covers the radioactive region 210 of the conversion material 200. In some embodiments, the radiation dosimeter 300 is in contact with the radioactive region 210 of the conversion material 200, and the radiation dosimeter 300 is further in contact with the other regions of the conversion material 200 that are not radioactive. In some embodiments, the radiation dosimeter 300 is in contact with the main body 410 of the first positioning component 400. In some embodiments, the conversion material 200 is spaced apart from the top portion 610 of the second positioning component 600. In some embodiments, the conversion material 200 is located between the radiation dosimeter 300 and the anti-slip material 500. In some embodiments, an area (or a volume) of the radiation dosimeter 300 is greater than an area (or a volume) of the conversion material 200.

Figure 13:
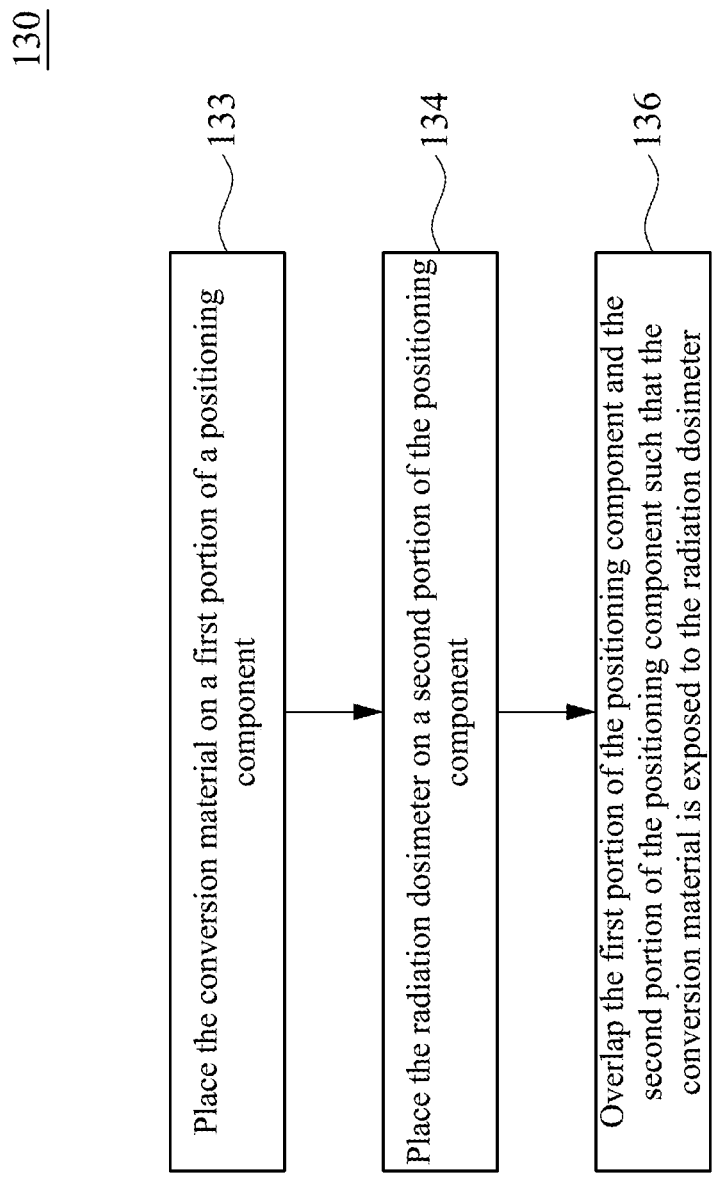
FIG. 13 is a flow chart of a neutron measuring method in accordance with some embodiments of the present disclosure.

FIG. 13 is a flow chart of the operation 130 of the neutron measuring method 100 in accordance with some embodiments of the present disclosure. In some embodiments, the operation 130 of FIG. 13 includes multiple operations (or steps) and may be performed by using a neutron measuring device MD2 of FIG. 14. For clarity and ease of explanation, the flow chart of FIG. 13 (i.e., the operation 130) will be described together with FIG. 14. The flow chart shown in FIG. 13 is merely an example, and is not intended to limit the present disclosure beyond what is explicitly recited in the claims. Additional operations can be provided before, during, and after the operation 130 of FIG. 13, and some operations described can be replaced, eliminated, or moved around for additional embodiments of the process. For clarity and ease of explanation, some elements of the figures have been simplified.

Figure 14:
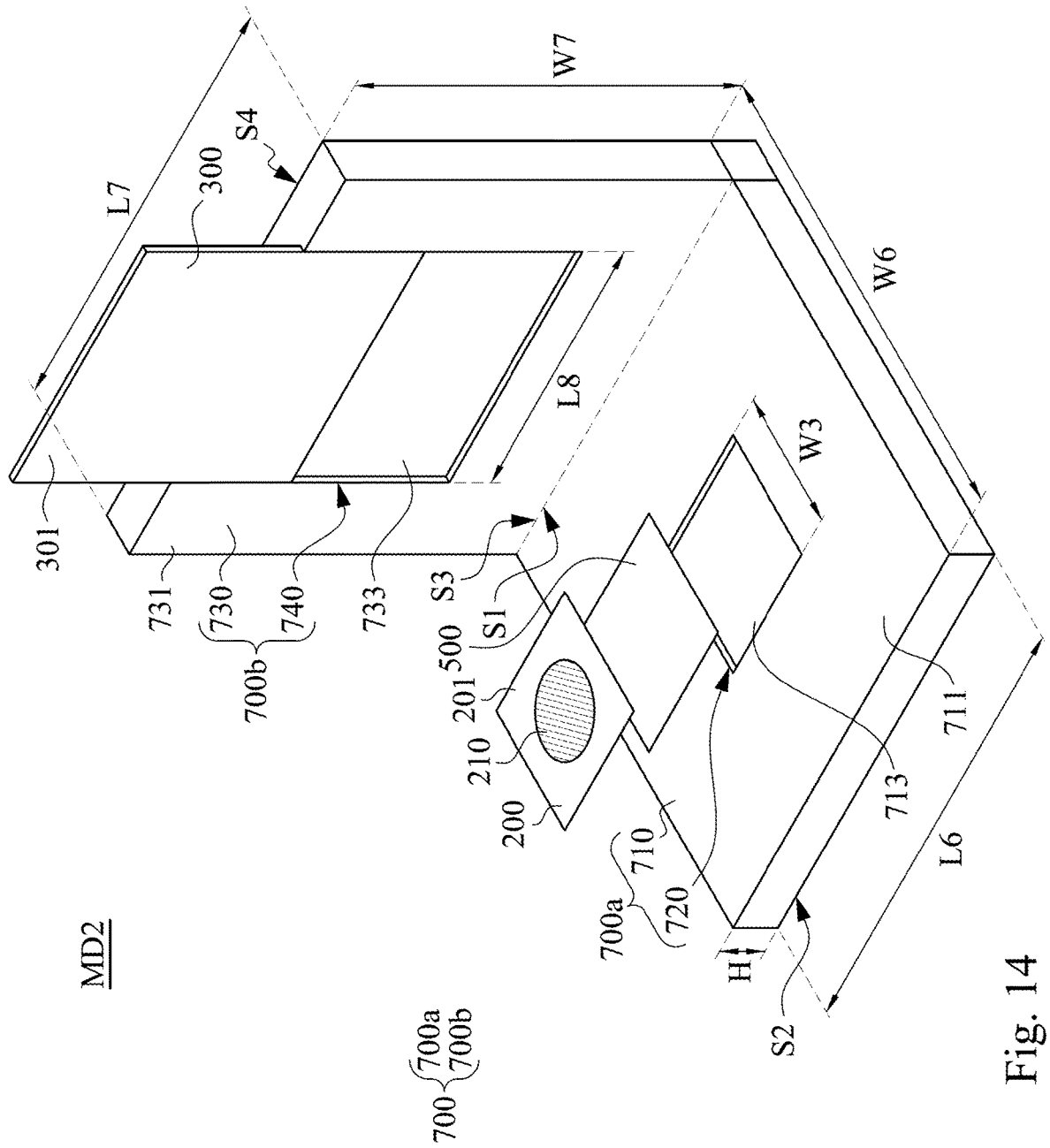
FIG. 14 is a schematic view of the neutron measuring device in accordance with some embodiments of the present disclosure.

Referring to FIG. 13, at operation 133, the conversion material is placed on a first portion of a positioning component, in which the conversion material includes the radioactive region. Referring to FIG. 14, in some embodiments of the operation 133 of FIG. 13, the conversion material 200 is placed on a first portion 700a of a positioning component 700, in which the conversion material 200 includes the radioactive region 210. The positioning component 700 includes the first portion 700a and a second portion 700b. A first side S1 of the first portion 700a of the positioning component 700 is connected (e.g., pivotally connected) to a first side S3 of the second portion 700b of the positioning component 700. The first portion 700a of the positioning component 700 includes a first main body 710 and a first recess 720, and the second portion 700b of the positioning component 700 includes a second main body 730 and a second recess 740. The first recess 720 extends downward from a top surface 711 of the first main body 710 and exposes a bottom surface 713, and the first recess 720 is configured to accommodate the conversion material 200 with the radioactive region 210. Furthermore, the second recess 740 extends downward from a top surface 731 of the second main body 730 and exposes a bottom surface 733, and the second recess 740 is configured to accommodate the radiation dosimeter 300.

In some embodiments, a length L6 of the first main body 710 of the first portion 700a of the positioning component 700 is in a range of about 50 millimeters to about 300 millimeters (e.g., 200 millimeters), a width W6 of the first main body 710 of the first portion 700a of the positioning component 700 is in a range of about 75 millimeters to about 400 millimeters (e.g., 250 millimeters), and a height H of the first main body 710 of the first portion 700a of the positioning component 700 is in a range of about 30 millimeters to about 100 millimeters (e.g., 60 millimeters). In some embodiments, a width W3 of the first recess 720 of the first portion 700a of the positioning component 700 is in a range of about 10 millimeters to about 250 millimeters (e.g., 150 millimeters). A width of the conversion material 200 is substantially equal to the width W3 of the first recess 720. In some embodiments, the first recess 720 is located at the middle the top surface 711 of the first main body 710. The first recess 720 and the second recess 740 may have rectangular profiles of different sizes.

In some embodiments, the first recess 720 is further configured to accommodate the anti-slip material 500, which is used to enhance the frictional force between the conversion material 200 and the first portion 700a of the positioning component 700, thereby helping the conversion material 200 be fixed (or secured) in the first recess 720.

As shown in FIG. 14, the conversion material 200 is placed on the first portion 700a of the positioning component 700 such that the conversion material 200 is placed in the first recess 720 of the first portion 700a and the top surface 201 of the conversion material 200 is substantially flush with (or level with) the top surface 711 of the first main body 710. In some embodiments, prior to placing the conversion material 200 on the first portion 700a of the positioning component 700, the anti-slip material 500 is placed on the first portion 700a of the positioning component 700 to help the conversion material 200 fixed (or secured) in the first recess 720. In other words, the anti-slip material 500 is in contact with the bottom surface 713 of the first recess 720, and the conversion material 200 is separated from the bottom surface 713 by the anti-slip material 500.

At operation 134 of FIG. 13, the radiation dosimeter is placed on s second portion of the positioning component.

Referring to FIG. 14, in some embodiments of the operation 134 in FIG. 13, the radiation dosimeter 300 is placed on the second portion 700b of the positioning component 700.

In some embodiments, a length L7 of the second main body 730 of the second portion 700b of the positioning component 700 is in a range of about 50 millimeters to about 300 millimeters (e.g. 200 millimeters), and a width W7 of the second main body 730 of the second portion 700b of the positioning component 700 is in a range of about 50 millimeters to about 300 millimeters (e.g. 200 millimeters). In some embodiments, a length L8 of the second recess 740 of the second portion 700b of the positioning component 700 is in a range of about 10 millimeters to about 250 millimeters (e.g. 150 millimeters). A length of the radiation dosimeter 300 is substantially equal to a length L8 of the second recess 740. In some embodiments, the second recess 740 is located at the middle the top surface 731 of the second main body 730. A ratio of the length L8 of the second recess 740 to the length L7 of the second main body 730 is in a range of about 0.2 to about 0.9 (e.g. 0.5).

In some embodiments, the radiation dosimeter 300 is placed on the second portion 700b of the positioning component 700 such that the radiation dosimeter 300 is placed in the second recess 740 and a top surface 301 of the radiation dosimeter 300 is substantially flush with the top surface 731 of the second main body 730.

At operation 136 of FIG. 13, the first portion of the positioning component and the second portion of the positioning component are overlapped such that the radioactive region of the conversion material is exposed to the radiation dosimeter. Referring to FIG. 14, in some embodiments of the operation 136 of FIG. 13, a second side S2 of the first portion 700a of the positioning component 700 and a second side S4 of the second portion 700b of the positioning component 700 are overlapped such that the radioactive region 210 of the conversion material 200 is exposed to the radiation dosimeter 300. With the configuration of the aforementioned neutron measuring device MD2, the stable and reliable positioning method can be provided to improve the exposure process of the conversion material 200 and the radiation dosimeter 300. As such, the operation process can be simplified, the processing time can be reduced, and the risk of excessive radiation doses received by operators can be reduced.

In some embodiments, the radiation dosimeter 300 in the second recess 740 is in contact with and fully covers the radioactive region 210 of the conversion material 200 in the first recess 720. In some embodiments, the radiation dosimeter 300 is in contact with the first portion 700a of the positioning component 700. In some embodiments, the radiation dosimeter 300 is in contact with the radioactive region 210 of the conversion material 200, and the radiation dosimeter 300 is further in contact with the other regions of the conversion material 200 that are not radioactive. In some embodiments, the radiation dosimeter 300 is in contact with the first main body 710 of the first portion 700a of the positioning component 700, while the conversion material 200 is spaced apart from the second main body 730 of the second portion 700b of the positioning component 700. In some embodiments, the conversion material 200 is located between the radiation dosimeter 300 and the anti-slip material 500. In some embodiments, the area (or volume) of the radiation dosimeter 300 is greater than the area (or volume) of the conversion material 200.

Figure 15:
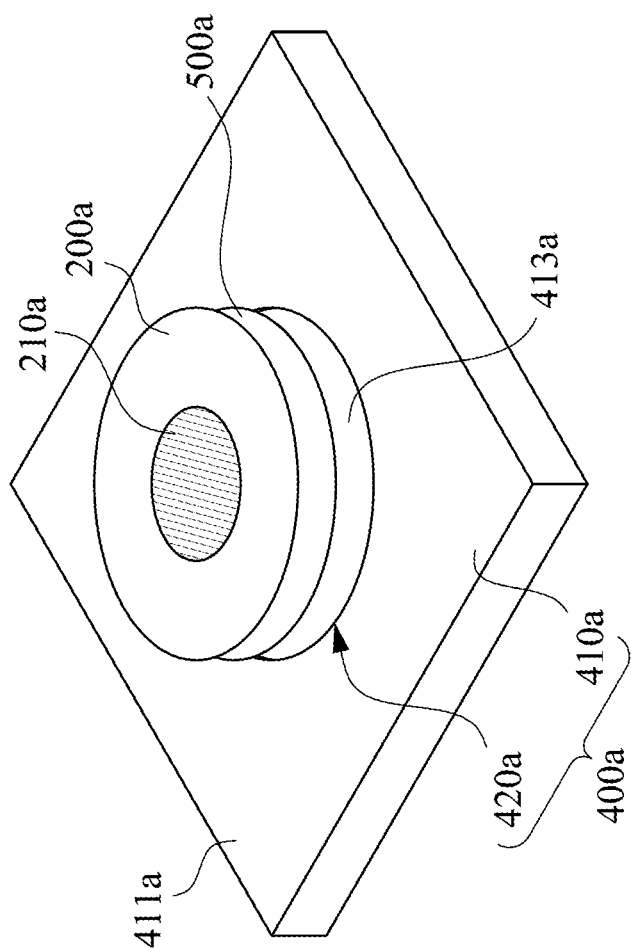
FIGS. 15-17 are schematic views illustrating conversion materials and a first positioning component in accordance with some embodiments of the present disclosure.
Figure 16:
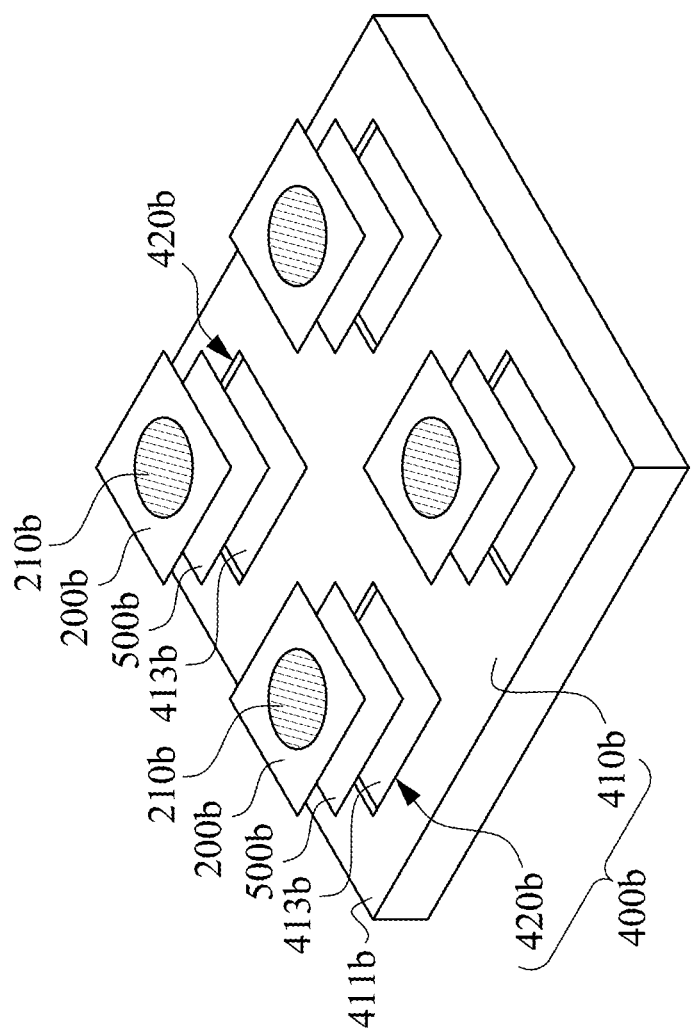
Figure 17:
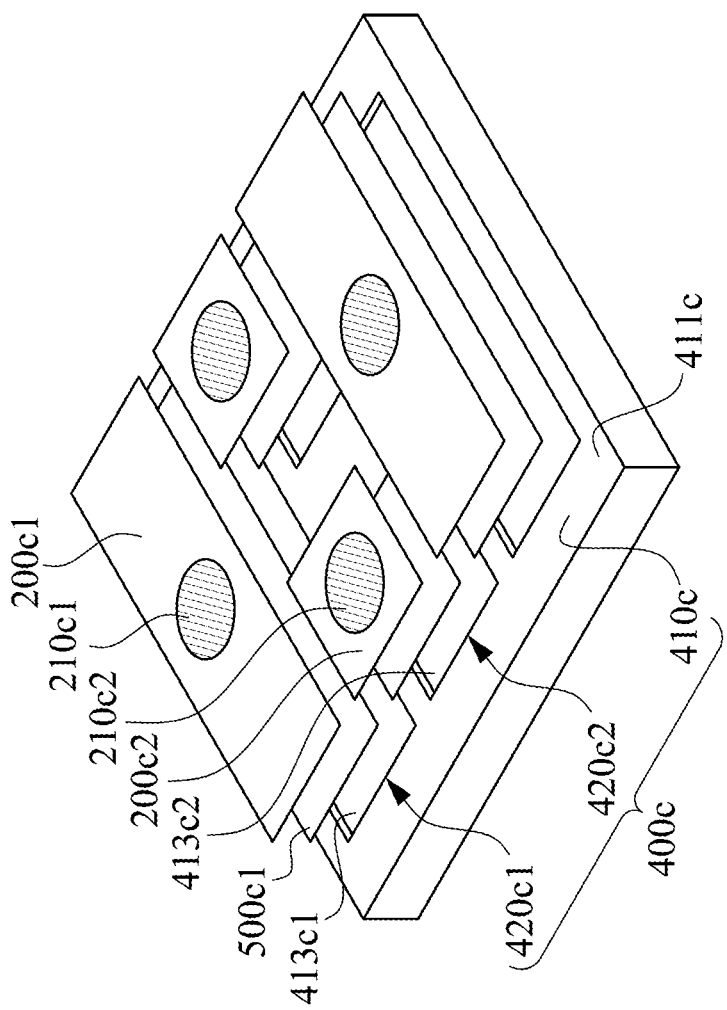

In some embodiments, structures of a conversion material and a first positioning component for accommodating the conversion material may differ from those illustrated in FIGS. 6 and 7. FIGS. 15 to 17 are schematic views illustrating conversion materials and a first positioning component in accordance with some embodiments of the present disclosure. As shown in FIG. 15, a first positioning component 400a includes a main body 410a and a recess 420a, in which the recess 420a extends downward from a top surface 411a of the main body 410a and exposes a bottom surface 413a. The recess 420a of the first positioning component 400a is configured to accommodate a conversion material 200a having a radioactive region 210a. The conversion material 200a has a circular cross-sectional profile, and the recess 420a of the first positioning component 400a corresponding to the conversion material 200a also has a circular cross-sectional profile. Furthermore, an anti-slip material 500a has a shape substantially equal to that of the conversion material 200a (e.g., the anti-slip material 500a has a circular cross-sectional profile corresponding to the conversion material 200a).

As shown in FIG. 16, a first positioning component 400b includes a main body 410b and a plurality of recesses 420b, in which each of the recesses 420b extends downward from a top surface 411b of the main body 410b and exposes a bottom surface 413b. The recesses 420b of the first positioning component 400b are respectively configured to accommodate a plurality of conversion materials 200b having radioactive regions 210b. In some embodiments, the number of the recesses 420b of the first positioning component 400b is from 2 to 25 (e.g., 4 recesses 420b exemplarily illustrated in FIG. 16), and the recesses 420b are respectively configured to accommodate 2 to 25 conversion materials 200b (e.g., 4 conversion materials exemplarily illustrated in FIG. 16). Each of the conversion material 200b has a rectangular cross-sectional profile, and each of the recess 420b of the first positioning component 400b corresponding to the conversion material 200b also has a rectangular cross-sectional profile. Furthermore, each of anti-slip materials 500b has a shape substantially equal to that of the conversion material 200b (e.g., each of the anti-slip materials 500b has a rectangular cross-sectional profile corresponding to the conversion material 200b).

As shown in FIG. 17, the first positioning component 400c includes a main body 410c, a plurality of recesses 420c1 and a plurality of recesses 420c2, in which each of the recesses 420c1 extends downward from a top surface 411c of the main body 410c and exposes a bottom surface 413c1, and each of the recesses 420c2 extends downward from a top surface 411c of the main body 410c and exposes a bottom surface 413c2. The recesses 420c1 of the first positioning component 400c are respectively configured to accommodate a plurality of conversion materials 200c1 having radioactive regions 210c1, and the recesses 420c2 of the first positioning component 400c are respectively configured to accommodate a plurality of conversion materials 200c2 having radioactive region 210c2. In some embodiments, the number of recesses 420c1 of the first positioning component 400c is from 0 to 25 (e.g., 2 recesses 420c1 exemplarily illustrated in FIG. 17), and the recesses 420c1 are respectively configured to accommodate 0 to 25 conversion materials 200c1 (e.g., 2 conversion materials 200c1 exemplarily illustrated in FIG. 17). In some embodiments, the number of recesses 420c2 of the first positioning component 400c is from 0 to 25 (e.g., 2 recesses 420c2 exemplarily illustrated in FIG. 17), and the recesses 420c2 are respectively configured to accommodate 0 to 25 conversion materials 200c2 (e.g., 2 conversion materials 200c2 exemplarily illustrated in FIG. 17), in which a sum of the number of the recess(es) 420c1 and the recess(es) 420c2 is at least one, and a sum of the number of the conversion material(s) 200c1 and the conversion material(s) 200c2 is at least one. In some embodiments, the number of the recesses 420c1 of the first positioning component 400c corresponds to (e.g., the same as) the number of the conversion materials 200c1, and the number of recesses 420c2 of the first positioning component 400c corresponds to (e.g., the same as) the number of conversion materials 200c2. Each of the conversion materials 200c1 has a rectangular cross-sectional profile, a square cross-sectional profile, or a circular cross-sectional profile, and each of the recesses 420c1 of the first positioning component 400c corresponding to the conversion material 200c1 also has a rectangular cross-sectional profile, a square cross-sectional profile, or a circular cross-sectional profile. Each of the conversion materials 200c2 has a rectangular cross-sectional profile, a square cross-sectional profile, or a circular cross-sectional profile, and each of the recesses 420c2 of the first positioning component 400c corresponding to the conversion material 200c2 also has a rectangular cross-sectional profile, a square cross-sectional profile, or a circular cross-sectional profile. In some embodiments, the shape of one of the conversion materials 200c1 is the same as the shape of one of the conversion materials 200c2, and the shape of one of the recesses 420c1 is the same as the shape of one of the recesses 420c2. In some embodiments, the shape of one of the conversion materials 200c1 is different from the shape of one of the conversion materials 200c2, and the shape of one of the recesses 420c1 is different from the shape of one of the recesses 420c2. Furthermore, each of the anti-slip material 500c1 has a shape substantially the same as that of the conversion materials 200c1 (e.g., each of the anti-slip material 500c1 has a rectangular cross-sectional profile, a square cross-sectional profile, or a circular cross-sectional profile corresponding to the conversion material 200c1), and the anti-slip material 500c2 has a shape substantially the same as that of the conversion material 200c2 (e.g., each of the anti-slip material 500c2 has a rectangular cross-sectional profile, a square cross-sectional profile, or a circular cross-sectional profile corresponding to the conversion material 200b).

Figure 18:
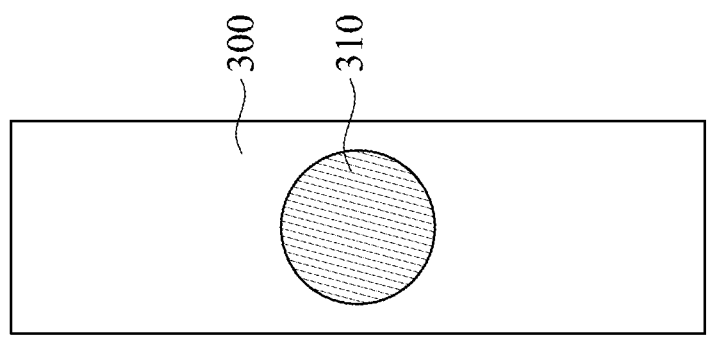

Returning to FIG. 1, the neutron measuring method 100 then proceeds to operation 140 after the operation 130, where an imaging region is formed on the radiation dosimeter. Referring to FIG. 18, in some embodiments of the operation 140, an imaging region 310 with radiation energy deposition is formed on the radiation dosimeter 300. The imaging region 310 serves as a storage region for radiation energy. Thereafter, the neutron measuring method 100 then proceeds to operation 150, where the imaging region on the radiation dosimeter is read. Referring to FIG. 18, in some embodiments of the operation 150, the imaging region 310 on the radiation dosimeter 300 is read. In some embodiments, the imaging region 310 on the radiation dosimeter 300 is read by using a reader.

In some embodiments, the radiation dosimeter 300 is an imaging plate. The imaging plate may include a sensitive layer, a protective layer, and a supporting layer. The sensitive layer is also referred as a photo-stimulable phosphor layer, and the sensitive layer is mainly composed of phosphors such as BaFBr:Eu2+ and CsBr:Ga+. Impurities in the phosphors (e.g., Eu2+ in BaFBr:Eu2+) are used to change the energy level structure of electrons and the properties of the materials. After the imaging plate is exposed by radiation, the radiation energy is absorbed, thereby causing the impurities (also referred as activators) to emit electrons, in which the electrons may enter into the conduction band. During the process of returning to a ground state, the electrons are trapped by electron holes in the fluoride of the phosphor. As such, the absorbed radiation energy is temporarily stored in the imaging plate in a manner of the electron traps.

In some embodiments where the radiation dosimeter 300 is the imaging plate, as illustrated in the operation 150 of FIG. 1, a laser light may be used to scan the imaging plate. The energy from the laser light excites the electrons in the electron traps, thereby causing the electrons to re-excite to the conduction band and release energy in a manner of photons when returning to the ground state. These photons can be collected (e.g., by using a photomultiplier tube) and converted into electronic signals to obtain the stored image.

In some embodiments, the neutron measuring method 100 further includes performing a cleaning process on the radiation dosimeter 300. For example, prior to the operation 130, a cleaning process is performed on the radiation dosimeter 300 to remove energy storage caused by background radiation. After the operation 150, a cleaning process is performed on the radiation dosimeter 300 to re-excite the electrons remaining in the electron traps.

In some embodiments, the radiation dosimeter 300 is a radiochromic film. The radiochromic film is a self-developing film that changes color upon exposed by radiation, in which the darkness of color is proportional to the radiation doses absorbed. The radiochromic film may be made of carbon, hydrogen, oxygen, nitrogen, lithium, chlorine, or other suitable materials. The radiochromic film is double-sided photosensitive and its activator may include diacetylene ($C_4H_2$). When the radiochromic film is exposed by radiation, the activator undergoes a polymerization reaction, and solidified into a colored (e.g., blue or green) polydiacetylene. Since the mechanism of the radiochromic film is color change after radiation exposure, image reading is more direct and can be read by using a scanner or densitometer (the operation 150). The obtained image gradient may be converted into the radiation dose received by the radiochromic film.

In summary, the neutron measuring device and the neutron measuring method of the present disclosure provide the stable and reliable positioning method, improve the exposure process of the conversion materials and the radiation dosimeter. As such, the operation process can be simplified, the processing time can be reduced, and the risk of excessive radiation doses received by operators can be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A neutron measuring method, comprising:
placing a conversion material on a first positioning component, wherein the conversion material comprises a radioactive region;
placing a radiation dosimeter on a second positioning component; and
overlapping the first positioning component and the second positioning component such that the radioactive region of the conversion material is exposed to the radiation dosimeter,
wherein the second positioning component comprises a top portion, a first supporting side portion, a second supporting side portion, and a rear blocking plate,
wherein the first supporting side portion and the second supporting side portion are respectively connected to two opposite sides of the top portion, and
wherein the top portion, the first supporting side portion, the second supporting side portion, and the rear blocking plate define a space.

2. The neutron measuring method of claim 1, wherein the first positioning component comprises a main body and a recess, wherein placing the conversion material on the first positioning component is performed such that the conversion material is placed in the recess and a top surface of the conversion material is substantially flush with a top surface of the main body.

3. The neutron measuring method of claim 2, wherein overlapping the first positioning component and the second positioning component is performed such that the radiation dosimeter is in contact with the main body of the first positioning component.

4. The neutron measuring method of claim 2, further comprising:
placing an anti-slip material on the first positioning component prior to placing the conversion material on the first positioning component.

5. The neutron measuring method of claim 4, wherein the conversion material is separated from a bottom surface of the recess of the first positioning component by the anti-slip material.

6. The neutron measuring method of claim 4, wherein the conversion material is in contact with the anti-slip material, and the anti-slip material is in contact with a bottom surface of the recess of the first positioning component.

7. The neutron measuring method of claim 1, wherein overlapping the first positioning component and the second positioning component is performed such that the radiation dosimeter fully covers the radioactive region of the conversion material.

8. The neutron measuring method of claim 1, wherein overlapping the first positioning component and the second positioning component is performed such that the first positioning component is placed in the space of the second positioning component.

9. The neutron measuring method of claim 1, wherein the first supporting side portion has a first concave edge and the second supporting side portion has a second concave edge, wherein placing the radiation dosimeter on the second positioning component is performed such that the radiation dosimeter is placed in a top portion of the space defined by the first concave edge and the second concave edge.

10. A neutron measuring method, comprising:
placing a conversion material on a first portion of a positioning component, wherein the conversion material comprises a radioactive region;
placing a radiation dosimeter on a second portion of the positioning component, wherein a first side of the first portion of the positioning component is connected to a first side of the second portion of the positioning component;
overlapping a second side of the first portion of the positioning component and a second side of the second portion of the positioning component such that the radioactive region of the conversion material is exposed to the radiation dosimeter;

forming an imaging region on the radiation dosimeter after overlapping the second side of the first portion of the positioning component and the second side of the second portion of the positioning component; and reading the imaging region on the radiation dosimeter.

11. The neutron measuring method of claim 10, wherein the first portion of the positioning component comprises a first main body and a first recess, wherein placing the conversion material on the first portion of the positioning component is performed such that the conversion material is placed in the first recess and a top surface of the conversion material is substantially flush with a top surface of the first main body.

12. The neutron measuring method of claim 11, wherein the second portion of the positioning component comprises a second main body and a second recess, wherein placing the radiation dosimeter on the second portion of the positioning component is performed such that the radiation dosimeter is placed in the second recess and a top surface of the radiation dosimeter is substantially flush with a top surface of the second main body.

13. The neutron measuring method of claim 12, wherein overlapping the second side of the first portion of the positioning component and the second side of the second portion of the positioning component is performed such that the radiation dosimeter in the second recess is in contact with the conversion material in the first recess.

14. The neutron measuring method of claim 10, wherein overlapping the second side of the first portion of the positioning component and the second side of the second portion of the positioning component is performed such that the radiation dosimeter fully covers the radioactive region of the conversion material.

15. The neutron measuring method of claim 10, further comprising:

performing a clean process on the radiation dosimeter prior to placing the conversion material on the first portion of the positioning component.

16. A neutron measuring device, comprising:

a first positioning component comprising a main body and a recess, wherein the recess is configured to accommodate a conversion material having a radioactive region; and a second positioning component comprising an accommodation space, wherein the accommodation space is configured to accommodate a radiation dosimeter, wherein when the second positioning component is overlapped on the first positioning component, the radiation dosimeter in the accommodation space of the second positioning component is in contact with the conversion material in the recess of the first positioning component.

17. The neutron measuring device of claim 16, wherein the second positioning component further comprises a top portion, a first supporting side portion, a second supporting side portion, and a rear blocking plate, wherein the first supporting side portion and the second supporting side portion are respectively connected to two opposite sides of the top portion, and the accommodation space is defined by the top portion, the first supporting side portion, the second supporting side portion, and the rear blocking plate, and wherein the first supporting side portion has a first concave edge and the second supporting side portion has a second concave edge, the first concave edge and second concave edge are configured to guide the radiation dosimeter along a direction into a portion of the accommodation space, and the remaining portions of the accommodation space is configured to accommodate the first positioning component.

18. The neutron measuring device of claim 16, wherein a side of the first positioning component is pivotally connected to a side of the second positioning component.

* * * * *